United States Patent
Ugolini

(10) Patent No.: US 6,546,843 B2
(45) Date of Patent: Apr. 15, 2003

(54) MULTI-TANK MACHINE FOR PRODUCING AND DISPENSING COLD OR ICED BEVERAGES AND METHOD OF OPERATING AND CONTROLLING THE SAME

(75) Inventor: Giancarlo Ugolini, Milan (IT)

(73) Assignee: Ugolini S.p.A. (IT)

( * ) Notice: Subject to any disclaimer, the term of this patent is extended or adjusted under 35 U.S.C. 154(b) by 0 days.

(21) Appl. No.: 09/865,233

(22) Filed: May 29, 2001

(65) Prior Publication Data

US 2001/0050004 A1 Dec. 13, 2001

(30) Foreign Application Priority Data

Jun. 7, 2000 (IT) .......................................... MI00A1258

(51) Int. Cl.⁷ ............................ A47J 31/00; F25B 49/02
(52) U.S. Cl. ................................ 99/275; 62/70; 62/390; 62/392; 62/394; 62/331
(58) Field of Search ............................... 99/275, 323.1, 99/286; 62/392, 394, 390, 338, 331, 70

(56) References Cited

U.S. PATENT DOCUMENTS

| | | | |
|---|---|---|---|
| 4,526,012 A | * 7/1985 | Chigira | 62/394 X |
| 4,850,269 A | * 7/1989 | Hancock et al. | 99/323.1 |
| 5,839,291 A | * 11/1998 | Chang | 62/393 X |
| 5,901,884 A | * 5/1999 | Goulet et al. | 62/392 X |

* cited by examiner

Primary Examiner—Reginald L. Alexander
(74) Attorney, Agent, or Firm—Shlesinger, Fitzsimmons & Shlesinger

(57) ABSTRACT

A machine for producing and dispensing cold or iced beverages comprises a plurality of beverage-containing tanks (11). Each tank is provided with an evaporator (12) for a refrigerating circuit and a mixer (13). The evaporators are connected with one and the same compressor (15) by connection and controlled-shutoff valves (16). The machine comprises a control system (22) receiving information (23, 24) about the temperature and/or density of the beverage in each tank and sending enable or cut-off signals respectively to the valves (16), which signals are distributed cyclically and in time so as to have a sequential enable of the valves themselves. In each enable sequence each valve is enabled for a time which is a function of the difference between the temperature and/or density detected in the associated tank and the predetermined density and/or temperature to be reached in such a tank.

7 Claims, 1 Drawing Sheet

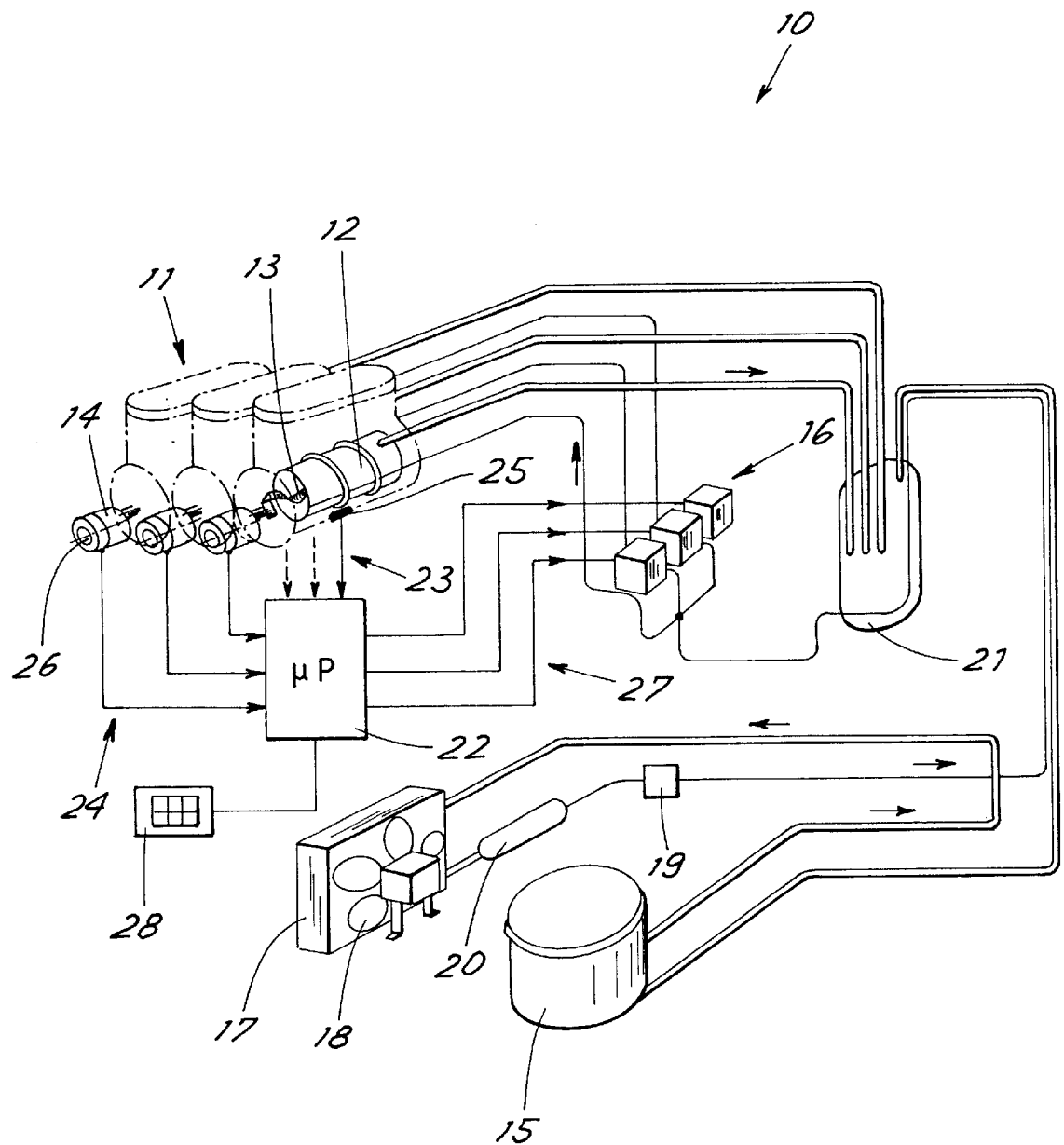

MULTI-TANK MACHINE FOR PRODUCING AND DISPENSING COLD OR ICED BEVERAGES AND METHOD OF OPERATING AND CONTROLLING THE SAME

BACKGROUND OF THE INVENTION

The present invention relates to a multi-tank machine for producing and dispensing cold or iced beverages. The invention also relates to a method of operating and controlling such a machine. Cold- or iced-beverage dispensers are known in the art which are formed of a (generally transparent) tank containing the evaporator of a refrigerating circuit and a power driven stirring propeller. In the tank the beverage is cooled and is then dispensed through an appropriate tap. Usually the evaporator is in the form of a hollow cylinder open at its ends and the propeller causes a circulation motion bringing the beverage into contact with both the inner and outer walls of the cylinder. Machines of the above described general type have been also proposed in which the tanks are more than one, each used to produce a different beverage. For cold generation in the different tanks, different technical solutions have been proposed.

The most immediate solution is that of providing each tank with a refrigerating circuit of its own. In this way, regulation of the cooling system is simplified since operation of the refrigerating circuit is completely independent in the different tanks. Once the beverage in a tank has reached the desired density or temperature it is sufficient to turn the corresponding compressor off. The compressor is then started again when, either due to dispensing of the beverage and consequent restoring of its level in the tank with additional beverage at room temperature or due to heat loss from the tank to the outside, the temperature in the tank increases (or the density decreases) beyond a predetermined level. This solution has the advantage of allowing a good regulation accuracy and the greatest exploitation of the refrigerating capacity of each compressor, since the members producing a laminar flow (valve or capillary tube) and the gas amount can be adjusted based on the compressor and its dedicated evaporator.

In addition, the dispenser will be also adapted for use when only some of the available tanks are working, always achieving operation under optimal conditions. The limit of this solution is obviously its cost, since the refrigerating compressor is the member far more expensive in a dispenser for cold or iced beverages, as well as its bulkiness.

A known alternative solution is to connect all the evaporators in parallel with each other and provide a single refrigerating compressor. To carry out regulation of the refrigeration production in the tanks, a solenoid valve capable of shutting off gas passage is mounted on the refrigerating gas ducts leading to each evaporator. When in a given tank the set density or temperature is reached, the corresponding solenoid valve is shut, so that exclusion of the tank evaporator from the refrigerating circuit is caused. The compressor is turned off only when all the solenoid valves are closed. When the product in a tank reaches such a condition that further cooling is required, the corresponding solenoid valve is opened again and the compressor (if turned off) is started again. This system still enables achievement of a good regulation accuracy but it is not possible to optimise the available refrigerating capacity. In fact, the compressor may be in operation with one, two or more solenoid valves in an open condition and therefore adjustment of the members producing a laminar flow and of the gas amount is to be carried out so as to work with one, two or more evaporators. This inevitably leads to a compromise condition, with a yield that must be maintained to a lower level than the optimal one when all evaporators are connected so as to have a still acceptable yield when a single evaporator is connected. In fact, should operation with all evaporators connected be optimised, there would be an excessive charge when one or more solenoid valves are closed and, on the contrary, by optimising operation for a single evaporator, there would be an insufficient charge when more then one valve is open.

A further drawback of the above solution is represented by the fact that balancing of the refrigerating flows towards the evaporators is particularly critical during the starting cooling cycle because during this step, in which the product is brought from the starting temperature (usually room temperature) to the desired temperature or density, the refrigerating circuit works uninterruptedly without any control system, and flow balancing only takes place by effect of a mechanical diffuser consisting of a chamber with a single inlet and as many outlets as the evaporators. All mechanical working errors of this diffuser (such as section differences in the outlet ducts or geometrical differences in duct mounting) will put out of balance the gas flow towards the different evaporators, giving rise to a temperature difference between the different tanks that can be compensated for only when the coldest tank reaches the set temperature and therefore closes the corresponding valve.

In a third known solution all evaporators are permanently connected (in series or in parallel) to a single compressor, without use of shutoff solenoid valves. This enables the refrigerating circuit to be optimised but on the other hand offers a very weak regulation of the temperature or density. In fact, the only way of stopping refrigeration production in a tank is turning the compressor off, thus interrupting refrigeration production in all the other tanks as well. This solution is therefore exclusively employed in cold beverage production (where accuracy in temperature regulation is less important) and never in iced beverage production. But even with this expedient, there is the further disadvantage that it is not possible to make the machine work using only some of the tanks for which it is provided. Finally, balancing of the refrigerating flows is rather critical because it will adversely affect the final temperature in the different tanks once the compressor has been stopped.

It is a general aim of the present invention to obviate the above mentioned drawbacks by providing a machine for producing and dispensing cold or iced beverages equipped with a plurality of tanks, with an optimal temperature control, high efficiency of the refrigerating circuit, ease and independence in regulating the beverage temperature or density in the different tanks and reduced cost and bulkiness. It is a further aim to provide an innovative method of control for such a machine.

SUMMARY OF THE INVENTION

In view of such an aim, in accordance with the intentional machine for producing and dispensing cold or iced beverages has been devised which comprises a plurality of beverage containing tanks, each provided with an evaporator of a refrigerating circuit and a mixer, the evaporators being connected with one and the same compressor by means of connection and controlled-shutoff valves, characterised in that it comprises a control system receiving information about the beverage temperature and/or density in each tank and sending enable or cut-off signals respectively to the valves, which signals are distributed cyclically and in time so as to have a sequential enable of the valves, in each enable sequence each valve being enabled for a time which is a function of the difference between the temperature and/or density detected in the associated tank and the predetermined density and/or temperature to be reached in such a tank.

Still in accordance with the invention, a control method has been also devised for a multi-tank machine with an evaporator for each tank and a single compressor connected by means of command-driven valves to the evaporators, which method comprises the cyclic steps of detecting information about the beverage temperature and/or density in each tank and allocating each valve an operating time which is more or less long depending on the distance between the detected temperature and/or density for the associated tank and the predetermined density and/or temperature to be reached in such a tank.

BRIEF DESCRIPTION OF THE DRAWING

For better explaining the innovative principles of the present invention and the advantages it offers over the known art, a possible embodiment applying such principles will be given hereinafter, by way of example, with the aid of the accompanying drawing.

DETAILED DESCRIPTION OF THE INVENTION

With reference to the only FIGURE, diagrammatically shown therein is the refrigerating circuit of a machine for producing and dispensing cold or iced beverages, generally denoted by 10. The machine comprises a plurality of beverage-containing tanks 11, each provided with an evaporator 12 for a refrigerating circuit. Advantageously, the evaporator is of a type provided with a cylindrical wall with open ends for circulation of the beverage. Also provided within and/or around the evaporator is a mixer in the form of a propeller 13, as substantially known for this type of machines. The mixer is powered by an electric reduction motor 14.

The evaporators 12 are connected with one and the same compressor 15 by means of solenoid valves 16 for connection and selective controlled shutoff of the evaporators to and from the refrigerating circuit respectively.

The refrigerating circuit obviously comprises all known elements for these types of circuits, such as a condenser 17 (possibly provided with a forced ventilation circuit 18), a capillary tube 19, a filter 20.

An accumulator 21 of appropriate volume may be also present for collecting the outputs of all evaporators and connect them to the compressor input.

The machine 10 comprises a control system 22, advantageously consisting of a substantially known suitably programmed microprocessor system. The control system 22 receives signals 23, 24 of information on the beverage temperature and/or density in each tank respectively. Such signals can be supplied from known temperature sensors 25, in thermal contact with the beverage, and known torque sensors 26 connected to the reduction motors for rotation of the mixers.

The control system 22 sends enable or cut-off signals 27 to valves 16 so as to drivingly connect an evaporator 12 to compressor 15.

Signals 27 are distributed cyclically and in time to provide a sequential valve enable, i.e. to enable a single valve at a time.

In this way, the refrigerating circuit can be optimised for use with a single evaporator.

In each enable sequence each valve is enabled for a time which is a function of the difference between the temperature and/or density detected by the sensors for the associated tank and the predetermined density and/or temperature to be reached in such a tank. Temperatures and/or densities can be preset in an independent manner for each tank, for example by means of a keyboard 28. Additionally or alternatively, a coded factory setting or a setting inserted once and for all in the control system 22 may be provided. It was found particularly advantageous that the sum of the enabling times of all valves in an enable sequence of the valves should be maintained substantially constant and equal to a predetermined overall time gap. For instance, keeping such overall time included between one and five minutes was found particularly advantageous.

To allow operation of the machine even when some tanks are excluded (because they have been removed from the machine or merely are not used) selector means is provided (consisting of the keyboard 28 itself, for example) drivingly operating the control system 22 for selective exclusion of the desired tanks from the enable sequence of the valves.

At this point it is apparent that the intended purposes have been reached, by providing a machine and an operating method allowing achievement of a precise control of the beverage cooling in several tanks without waste and with reduced costs and bulkiness.

Due to the fact that each evaporator is allocated a more or less long operating time depending on the distance between the detected parameters in the associated tank and the desired parameters for such a tank, achievement of a continuous balancing system capable of compensating for possible working inaccuracies of the individual ducts or other inaccuracies is allowed. In addition, regulation of both the members producing a laminar flow and the gas amount can be obtained, so as to optimise operation with a single evaporator. Finally, when one or more tanks are turned off, they will be completely excluded from the circuit without affecting operation of the other tanks at all.

Obviously, the above description of an embodiment applying the innovative principles of the present invention is given by way of example only and therefore must not be considered as a limitation of the scope of the invention as herein claimed.

For instance, the machine will be provided with a housing or covering body as preferred and if desired will include those accessories that are known in this particular field and are not herein shown for the sake of simplicity.

What is claimed is:

1. A machine for producing and dispensing cold or iced beverages comprising a plurality of beverage-containing tanks, each provided with beverage temperature sensors and density sensors, an evaporator of a refrigerating circuit and a mixer, the evaporators being connected with one and the same compressor by means of connection and controlled-shutoff valves, characterized in that it comprises a control system receiving information from said sensors about the beverage temperature and/or density in each tank and sending enable or cut-off signals respectively to the valves, which signals are distributed cyclically and in time so as to have a sequential enable of the valves, in each enable sequence each valve being enabled for a time which is a function of the difference between the beverage temperature and/or density detected in the associated tank and a predetermined density and/or temperature to be reached in such a tank.

2. A machine as claimed in claim 1, wherein the sum of the enabling times of all valves in an enable sequence of the valves is constant and equal to a predetermined overall time gap.

3. A machine as claimed in claim 2, wherein the predetermined time gap is included between one and five minutes.

4. A machine as claimed in claim 1, wherein it comprises selector means for selective exclusion of tanks of the tank plurality from the enable sequence of the valves.

5. A method of operating a machine for producing and dispensing cold or iced beverages comprising a plurality of beverage-containing tanks, each provided with beverage temperature sensors and density sensors, an evaporator of a refrigerating circuit and a mixer, the evaporators being connected with one and the same compressor by means of connection and controlled shut-off valves, the method comprising the cyclic steps of detecting information from said sensors about the beverage temperature and/or density in each tank and allocating each valve an operating time which is more or less long depending on the difference between the detected temperature and/or density for the associated tank and a predetermined density and/or temperature to be reached in such a tank.

6. A method as claimed in claim 5, wherein the sum of the enabling times of all valves in an enable sequence of the valves is maintained constant and equal to a predetermined overall time gap.

7. A method as claimed in claim 6, wherein the predetermined time gap is included between one and five minutes.

* * * * *